United States Patent [19]
Ban

[11] 3,730,534
[45] May 1, 1973

[54] ENDLESS MAGNETIC TAPE CARTRIDGE REMOVING APPARATUS

[76] Inventor: Itsuki Ban, 829, Higashi-Oizumimachi, Werima-ku, Tokyo, Japan

[22] Filed: June 16, 1070

[21] Appl. No.: 46,703

[30] Foreign Application Priority Data

| | | |
|---|---|---|
| June 18, 1969 | Japan | 44/57040 |
| June 23, 1969 | Japan | 44/48941 |
| May 11, 1970 | Japan | 45/45027 |

[52] U.S. Cl...................274/4 B, 179/100.2 Z, 74/527
[51] Int. Cl...................G11b 5/00
[58] Field of Search..................274/11 B, 4 B, 4 F, 274/4 G; 179/100.2 Z; 242/55, 19 A; 352/74; 74/527

[56] References Cited

UNITED STATES PATENTS

| | | | |
|---|---|---|---|
| 3,575,421 | 4/1971 | Kato | 274/4 B |
| 3,489,417 | 1/1970 | Harper | 274/4 B |

*Primary Examiner*—William D. Martin, Jr.
*Assistant Examiner*—Dennis A. Dearing
*Attorney*—Jacobs & Jacobs

[57] ABSTRACT

An endless magnetic tape cartridge removing apparatus for a tape cartridge player which comprises a retention member engageable with a notch of the cartridge and bring the latter into a predetermined operative position, a displaceable member holding the retention member, a device for moving the displaceable member to the position where the retention member is escaped from the notch of the cartridge, and a pushing device for moving the cartridge away from the operative position whereby the cartridge is removed from the operative position by the pushing device when the retention member is escaped from the notch.

4 Claims, 5 Drawing Figures

ENDLESS MAGNETIC TAPE CARTRIDGE REMOVING APPARATUS

BACKGROUND OF THE INVENTION

This invention relates to an endless magnetic tape cartridge player, and more particularly to a novel apparatus for removing a cartridge from its operative position.

In a conventional endless magnetic tape cartridge player, it has been practiced to utilize a notch formed on the side wall of the cartridge in order to bring the cartridge into the operative position. More specifically, a spring pressure roller is provided to allow the same to be pressed on the inclined wall of the notch of the cartridge to exert the forward force on the cartridge to thus urge the cartridge in the operative position with respect to the tape driving capstan and the magnetic head.

In general, in removing the cartridge held in the operative position therefrom, the cartridge is manually taken out against the forward force relying on the spring pressure or retention roller. If this is effected by mechanical operation instead of manual operation, a solenoid is commonly used so that the cartridge is moved from the operative position into the non-operative position by energizing the solenoid. However, a disadvantage derived from the use of the solenoid is such that to remove the cartridge from the operative position requires great force since the cartridge receives relative strong force exerted by the retention roller, and the distance in which the cartridge is moved is lengthy. For this reason, the solenoid to be used should be massive or large scaled one to thus require much electricity. Such solenoid is too expensive and requires more space when it is mounted within the player. Further, a large scaled solenoid is actuated to produce large impact operative sound so that it is not desirable for a sound instrument in use.

SUMMARY OF THE INVENTION

It is a primary object of the invention to provide an endless magnetic tape cartridge removing apparatus, wherein a retention roller which presses a notch of the cartridge to held the latter in the operative position is retracted from the notch to break off the forward force urging the cartridge in the operative position, and the cartridge is moved back by a pushing means and removed automatically from the operative position.

Another object of the invention is to provide an endless magnetic tape cartridge removing apparatus, wherein by use of rotational force of a rotary capstan for driving the tape in the cartridge a displaceable member with a retention roller is moved to the position where the retention member is escaped from the notch in the cartridge side.

A further object of the invention is to provide an endless magnetic tape cartridge removing apparatus, including a friction wheel which is caused to selectively abut against the capstan and rotatably driven thereby, and wherein the displaceable member is moved in relation to rotation of the wheel.

According to the invention, the prior defect derived from the use of an electromagnetic plunger to remove the cartridge from the operative position is eliminated and advantage is in that relatively strong force is readily obtained to move the displaceable member since the latter may be moved by rotational force of the capstan. Moreover, the cartridge removed from the operative position may be readily and snugly taken out from the player without requiring a greater force as before.

Further objects and additional features of the invention will become apparent from the following detailed description and annexed drawings, wherein:

DESCRIPTION OF THE PREFERRED EMBODIMENTS

Figure 1:
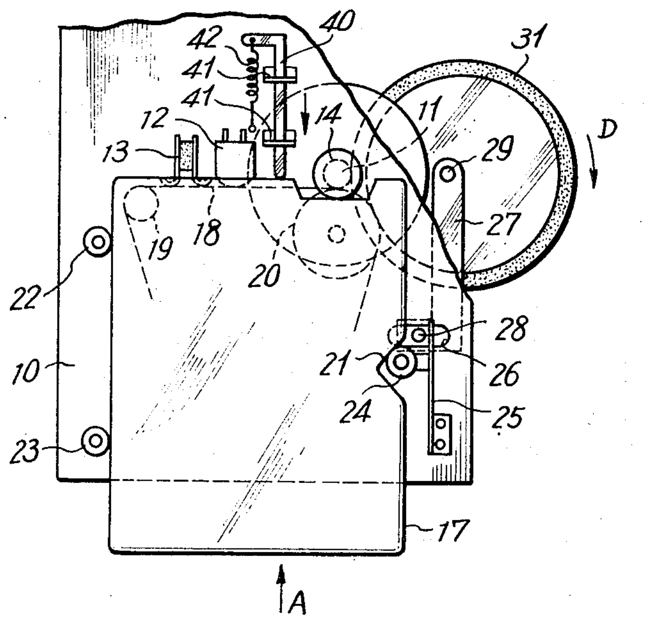
FIG. 1 is a schematic representation showing an embodiment of an endless magnetic tape cartridge removing apparatus for a tape cartridge player according to the present invention.
Figure 2:
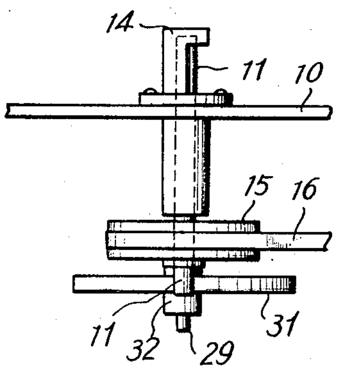
FIG. 2 is an enlarged view showing a vicinity of the capstan shown in FIG. 1.

Referring to the drawings, particularly to FIG. 1, numeral 10 designates a horizontal deck mounted within a housing (not shown) for an endless magnetic tape cartridge player. The deck 10 carries a capstan 11, a magnetic head 12, and an endmark detector 13 thereon. As best shown in FIG. 2, the capstan 11 is rotatably supported on a suitable bearing 14 rigidly fixed to the deck 10. The capstan 11 is adapted to be driven at constant speed by rotation of a flywheel 15 attached to the capstan 11 through a motor (not shown) by means of a belt 16. The magnetic head 12, as will be described later, is adapted to transduce an endless tape 18 in a tape cartridge 17. The tape cartridge 17 is in turn adapted to be inserted into the player and rests on the deck 10 and thus is brought into the operative position. The magnetic head 12 may be suitably moved by a shifting means (not shown due to no connection with the present invention) to the position to play a plurality of record tracks on the tape 18. The shifting means (not shown) is adapted to move the magnetic head 12 by one step in response to detection by the endmark detector 13 on an endmark (not shown) formed of conductive foil on the tape 10.

The tape cartridge 17 comprises a generally rectangular container accommodating the endless tape 18 helically wound in a conventional manner, a guide post 19 for the tape, and a rotatable pinch roller 20. A notch 21 is formed on the side wall of the cartridge 17. Guide members 22, 23 and 24 are arranged on the deck 10 to provide a way for the cartridge 17. The guide members 22 and 23 are substantially fixed to the deck 10 whereas the guide member or retention roller 24 is mounted to the free end of a displaceable member 25 of leaf spring of which one end is fixed to the deck 10. Now the cartridge 17 is inserted in the player in the direction of the arrow A to the position where the pinch roller 20 in the cartridge abuts against the capstan 11 over the tape 11, retention roller 24 is received in the notch 21 on the side of the cartridge under the influence of the displaceable member 25. Pressure of the retention roller 24 on the inclined wall of the notch 21 exerts the forward force on the cartridge 17 to hold the pinch roller 20 in the operative position where the pinch roller abuts against the capstan 11. FIG. 1 shows the cartridge 17 held in the operative position. When the cartridge 17 is held in the operative position, the tape 18 is driven across the endmark detector 13 and the magnetic head 12 in cooperation with the capstan 11 and the pinch roller 20.

The cartridge removing apparatus according to the present invention, which moves the cartridge 17 from the operative position into the non-operative position, includes a mechanism by which the retention member 24 allows the displaceable member 25 to escape from the notch 21 of the cartridge. The detail of such mechanism will be described hereinafter by reference to FIGS. 1 to 3. Similar numerals are used to illustrate to indicate like parts in FIG. 1.

The mechanism comprises a substantially L-shaped movable lever 27 which has at one end a pin or an actuator 28 passing through an elongaged slot 26 bored through the deck 10 and extending upwardly of the deck 10. The pin 28 is adapted to engage the displaceable member. A supporting rod 30 has opposite ends supported axially and rotatably by suitable bearings (not shown) in parallel with the deck thereunder. A substantially vertical rod 29 is coupled to the supporting rod 30 at the mid portion thereof and is provided with the movable lever 27 at one end thereof. A round rubber covered frictional cam wheel 31 is eccentrically provided by a sleeve 32 to the rod 29 thereunder. The cam wheel 31 as will be described later is adapted to abut against the capstan 11 thereunder and thereby is rotated. The rod 29 is biased by a spring 33 in the direction that the eccentric cam wheel 31 abuts against the capstan 11, however, the rod is normally retained by a stopper lever 34 pivoted to a pin 36 in the position where the cam wheel 31 is not pressed against the capstan 11. The stopper lever 34 is biased by a spring (not shown) in the direction of the arrow as shown to allow the bent portion 35 to maintain engageable relation with the rod 29 at the lower end thereof. A plunger 38 of a solenoid 37 is coupled by a spring 39 to the stopper lever 34. The stopper lever 34 is adapted to swing to allow the bent portion 35 to disengage the rod 29 when the solenoid 37 is energized to attractively move the plunger 38.

A pushing lever 40 is slidably mounted to the substantially L-shaped guide or bracket 41 fixed to the deck 10. The pushing lever 40 is normally biased by a spring 42 in the direction of the arrow as shown. The pushing lever 40 is depressed at one end thereof by the leading edge of the cartridge when the cartridge 17 is manually inserted in the direction of the arrow A. Thus, the pushing lever 40 is slidably moved against the bias of the spring 42. From this it follows that energy is stored in the spring 42 for the period that the cartridge 17 is held in the operative position.

Figure 3:
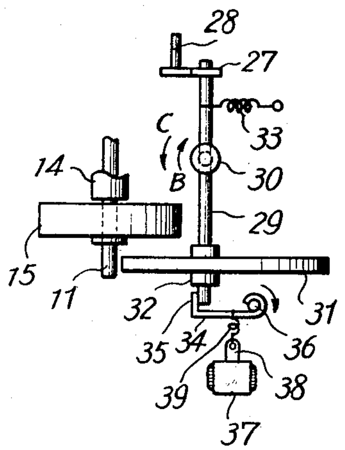
FIG. 3 is a representation showing a mechanism for moving the displaceable member illustrated in FIG. 1.

Now when the solenoid 37 is energized in pulse fashion, the stopper lever 34 is swung to the position where the bent portion 35 of the stopper lever 34 is disengaged from the rod 29. The rod 29 is swung by the bias of the spring 33 in the direction of the arrow B. At this time swingable movement of the rod 29 in the direction of the arrow B is made to a small extent and is therefore arrested by engagement of the cam wheel 31 with the capstan 11. After the cam wheel has been pressed against the capstan 11, the stopper lever 34 is not engaged by the rod 29 even though the solenoid 37 is deenergized since the bent portion 35 rides on the bottom end of the rod 29. Since the cam wheel 31 has the minimum eccentric portion which initially abuts against the capstan 11, the rod 29 is gradually swung in the direction of the arrow C when the cam wheel 31 is rotated by the capstan 11 in the direction of the arrow D. The rod 29 is swung in the direction of the arrow C during the time that the cam wheel 31 is rotated through a half revolution. Consequently, the actuator 28 is moved with the movable lever 27 in the rightward direction. This causes the actuator 28 to engage the displaceable member 25 and flex the latter against the bias thereof. Flection of the displaceable member 25 by the actuator 28 moves the retention roller 24 away from the notch 21 of the cartridge 17 in the operative position. The retention roller 24 is moved to the position so as to escape out of the notch 21 upon half revolution of the cam wheel. When the retention roller 24 is taken out of the notch 21 and the forward force exerted on the cartridge 17 is diminished, the leading edge of the cartridge is depressed by the pushing lever 40 urged in the direction of the arrow as shown by the spring 42 whereby the cartridge is moved back from the operative position. Accordingly, the pinch roller 20 is away from the capstan 11 to stop the running of the tape 18 thereby ending the play of the cartridge 17. Further rotation of the cam wheel 31 allows the maximum eccentric portion thereof to pass over the capstan 11 to change swingable movement of the rod 29 to the direction of the arrow C. When the cam wheel 31 is rotated through about 1 revolution, the lower end of the rod 29 engages the bent portion 35 of the stopper lever 34 to arrest swingable movement of the rod 29. As a result, pressure force derived from the cam wheel 31 and the capstan 11 exerted by the bias of the spring 33 has been diminished, and the cam wheel 31 is caused to slip against the capstan 11 and thereby is prevented from rotating at a point where the cam wheel 31 is just rotated through one revolution. FIG. 3 shows the cam wheel 31 caused to slip against the capstan 11. It will be understood that the cartridge 17 moved into the non-operative position may be snugly taken out, and that the cartridge may be readily brought into the operative position upon depression thereof in the direction of the arrow as shown.

Figure 4:
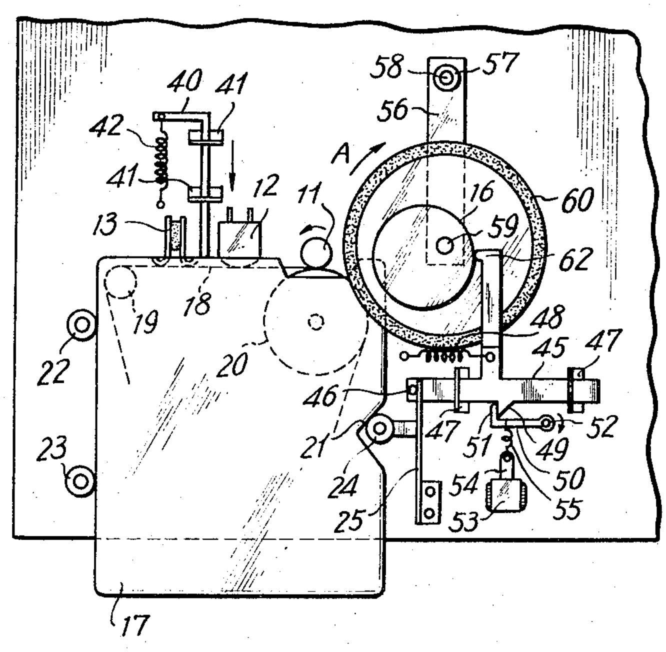
FIG. 4 is an explanatory view showing alternative embodiment of the endless magnetic tape cartridge removing apparatus of the invention.

Alternative embodiment of the tape cartridge removing apparatus according to the invention is shown in FIG. 4, wherein similar numerals are used to illustrate like parts in FIG. 1 for the illustrative purposes.

A substantially T-shaped movable lever 45 is slidably supported by a L-shaped guides 47 on the deck 10. The movable lever 45 has at one end thereof a pin or actuator 46 connected thereto. The actuator 46 is adapted to engage the displaceable member 25 and moves the same to the position where the retention roller 24 is escaped from the notch 21 of the cartridge 17 in the operative position. The lever 45 is intended to be biased leftward by a spring 48, however, movement of the lever 45 by the spring 48 is normally prevented by engagement of a projection 49 of the lever 45 with a bent portion 51 of a stopper lever 50 pivoted to a pin 52 fixed to the deck 10. The stopper lever 50 is biased by a spring (not shown) in the direction of the arrow as shown and is urged to engage the movable lever 45. A solenoid 53 is rigidly mounted by a suitable means to the deck 10 and provided with a plunger 54 at one end thereof. The stopper lever 50 is coupled by a spring 55 to the plunger 54 and is moved to disengage the moving lever 43 by energized solenoid 53. A mechanism is provided to move the movable lever 43 against the bias of the spring 48 and comprises a swingable lever 56 swingably supported by a sleeve 57 on a pin 58 mounted to the deck 10, a rubber frictional wheel 60 journaled to an axis fixed to the lever 56, and an eccentric cam 61 connected to the wheel 60 and rotatable with the same. The wheel 60 as will be described later is pressed against the capstan 11 and rotated thereby. The cam 61 is opposed to one portion 62 of the moving lever 45.

Now, the solenoid 53 is energized in pulse fashion, the stopper 50 is moved to the position to disengage the movable lever 45. At the same time the movable lever 45 is leftward moved by the bias of the spring 48. Leftward movement of the movable lever 45 causes the one portion 62 to press the cam 61 to thus swing the swingable lever 56 allowing the wheel 60 to abut against the capstan 11. Abutment force between the wheel 60 and the capstan 11 is imposed by the spring 48 and the wheel 60 is therefore rotated by the capstan 11. As the wheel 60 is rotated, the movable lever 45 is gradually and rightward moved by the cam 61 rotatable with the wheel 60 to allow the actuator 46 to press the displaceable member 25 whereby the retention roller 24 is gradually moved to the position to escape from the notch 21 of the cartridge 17 in the operative position. When the wheel 60 is rotated through a half revolution from the initial position, the movable lever 45 is moved to the rightmost by the cam 61 to allow the retention roller 24 to escape from the notch 21 of the cartridge. As a result, the cartridge 17 is moved into the non-operative position as the leading edge thereof is pressed by the push lever 40. As the wheel 60 is further rotated, the movable lever 45 is leftward moved, and the wheel 60 is rotated to make one revolution to permit the projection 49 to engage the bent portion 51 of the stopper lever 50 to arrest movement of the lever 45. In response to retention of the stopper lever 50 with the movable lever 45, pressure force derived from the wheel 60 and the capstan 11 imposed by the spring 48 is released because the wheel 60 no longer contacts the capstan 11 thereby stopping rotation of the wheel, as shown in FIG. 4.

It is apparent from the foregoing, the embodiment shown in FIG. 4 as similar to the embodiment in FIGS. 1 to 3 in that the cartridge in the operative position may be automatically moved into the non-operative position.

Figure 5:
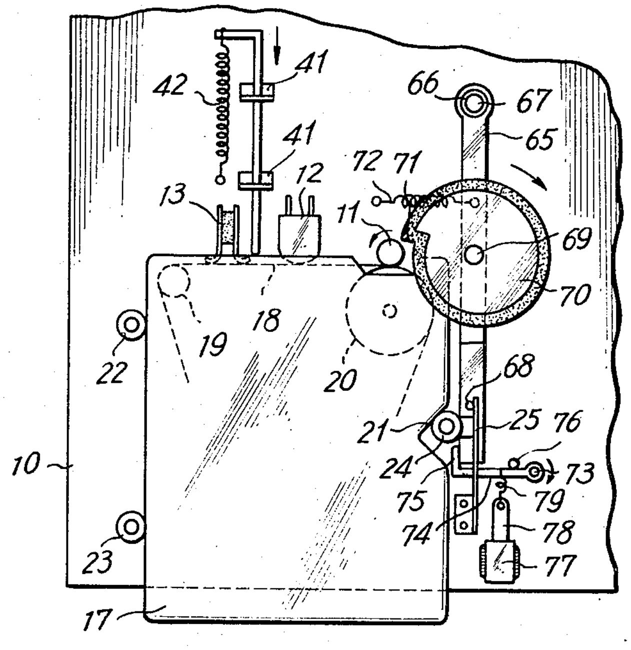
FIG. 5 is a schematic representation showing another embodiment of the endless magnetic tape cartridge removing apparatus of the invention.

In FIG. 5, another embodiment of the tape cartridge removing apparatus according to the invention, wherein similar numerals are used to illustrate like parts shown in FIGS. 1 and 4 for the illustrative purposes. A mechanism is provided to flex the displaceable member 25 to allow the retention roller 24 to escape from the notch 21 of the cartridge 17 in the operative position and includes a movable lever 65 pivotally supported by a sleeve 66 on a pin 67 fixed to the deck 10. A pin or actuator 68 is connected to the movable lever 65 thereon to engage the displaceable member 25. A rubber covered frictional cam wheel 70 is rotatably mounted on an axis 69 mounted to the movable lever 65. The cam wheel 70 as will be described later is caused to abut against the capstan 11 and rotatably driven thereby. The movable lever 65 is intended to be biased to the direction that the cam wheel 70 is pressed against the capstan 11, however, movement of the lever 65 by the spring 72 is arrested by a stopper lever 74 pivoted to a pin 73 connected to the deck 10. The stopper lever 74 is also intended to be biased by a spring (not shown) in the direction of the arrow as shown, however, movement of the lever 74 is arrested by a stopper pin 76 on the deck 10. The stopper lever 74 is coupled by a spring 79 to a plunger 78 provided in a solenoid 77 rigidly mounted by a suitable means to the deck 10. The stopper lever 74 is moved to the position where the bent portion 75 of the stopper lever is disengaged from the free end of the movable lever 65 by the energized solenoid.

Now, when the solenoid 77 is energized in pulse fashion, the stopper lever 74 is disengaged from the movable lever 65 to allow the latter to be clockwise swung by the bias of the spring 72 whereby the minimum eccentric portion of the wheel 70 abuts against the capstan 11. The cam wheel 70 pressed against the capstan 11 is rotatably driven in the direction of the arrow as shown whereas the movable lever 65 is gradually and counterclockwise swung as the cam wheel 70 is rotated. This flexes the displaceable member 25 by the actuator 68 to rotate the cam wheel through about a half revolution. At this point, the retention roller 24 is escaped from the notch 21 of the cartridge 11 in the operative position so that the cartridge 11 is moved back into the non-operative position as the leading edge thereof is pressed by the push lever 40. Further rotation of the cam wheel 70 changes swingable movement of the movable lever 65 to the clockwise direction, and the cam wheel 70 is rotated through about 1 revolution to allow the free end of the movable lever 65 to engage the bent portion of the stopper lever 74 to thus prevent swingable movement of the movable lever 65. With retention of the movable lever 65 with the stopper lever 74, pressure force between the cam wheel 70 and the capstan 11 exerted by the bias of the spring 72 is diminished at the same time the cam wheel 70 is completely disconnected from the capstan 11 to stop rotation of the cam wheel 70. As shown in FIG. 5, when the lever 65 is in the position shown, the stepped portion 71 of the cam wheel 70 insures that the cam wheel 70 is completely away from the capstan 11.

As described in the above, according to the embodiment shown in FIG. 5, the cartridge 17 held in the operative position may be automatically moved form the operative position into the non-operative position.

Although the invention has been described with reference to specific embodiments, it is apparent that the invention is not to be limited to the embodiments illustrated, and, accordingly, changes and variations may be made without departing from the spirit and scope of the invention as defined in the appended claims.

What is claimed is:

1. In a tape cartridge player for playing an endless magnetic tape cartridge, the cartridge having a notch in the side wall thereof, an apparatus for automatically removing the cartridge from a predetermined operative position in said player, comprising a deck; a rotary capstan on said deck rotatable at constant speed for driving an endless magnetic tape in a cartridge in said operative position; a retention member engageable with said notch in the cartridge for exerting a force on the cartridge to bring the latter in said operative position; a displaceable member on said deck and coupled to said retention member for positioning it with respect to said notch in the cartridge; a pivotably movable lever mounted on said deck for reciprocal movement between first and second positions; an actuator fixed to said lever and arranged to be engageable with the displaceable member; bias means for biasing the lever toward said first position; a stopper means for releasably retaining the lever in said second position against the bias of the bias means; a circular frictional wheel eccentrically mounted for rotation on said lever, said lever being operable when released from the second position by the stopper means to move under the bias of the bias means to the first position, said frictional wheel being arranged on said lever to abut against the capstan when the lever is in said first position and said frictional wheel being operable when rotated by said capstan to swing said lever and thereby move the lever from said first position to said second position at the completion of one revolution of said frictional wheel, said capstan and said frictional wheel being disengaged when said stopper member re-engages said lever, said lever being operable, during the period when it is being moved by the frictional wheel against the bias of said bias member, to move said displaceable member by engagement of said displaceable member with said actuator between the position where said retention member is engaged with said notch and the position where said retention member is escaped from said notch; and pushing means engageable with the cartridge in said operative position for pressing the cartridge away from the operative position when said retention member is escaped from said notch.

2. Said apparatus in accordance with claim 1, wherein said pushing means includes a push rod which is slidably provided on said deck having one end arranged to engage the leading edge of a cartridge in said operative position, and a spring for urging the push rod in the direction that the push rod presses the cartridge away from the operative position, and wherein energy is stored in the spring by depression of the push rod by the cartridge when the cartridge is brought into the operative position.

3. Said apparatus in accordance with claim 2, wherein said stopper means comprises a stopper lever arranged to be engageable with said lever, and a solenoid coupled to the stopper for moving the stopper lever into the position to disengage from the lever when the solenoid is energized.

4. Said apparatus in accordance with claim 1, wherein said frictional wheel has a stepped portion at the minimum eccentric portion thereof, the frictional wheel being spaced away from said capstan with the stepped portion being adjacent the capstan when said stopper lever is retained by said movable lever.

* * * * *